(12) United States Patent
Wohlert et al.

(10) Patent No.: US 11,580,198 B2
(45) Date of Patent: *Feb. 14, 2023

(54) SYSTEM AND METHOD FOR PROVIDING MULTIMEDIA DIGITAL RIGHTS TRANSFER

(71) Applicant: AT&T Intellectual Property I, L.P., Atlanta, GA (US)

(72) Inventors: Randolph Wohlert, Austin, TX (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/294,203

(22) Filed: Mar. 6, 2019

(65) Prior Publication Data

US 2019/0205504 A1    Jul. 4, 2019

Related U.S. Application Data

(63) Continuation of application No. 13/667,579, filed on Nov. 2, 2012, now Pat. No. 10,268,805, which is a continuation of application No. 12/693,521, filed on Jan. 26, 2010, now Pat. No. 8,312,158.

(51) Int. Cl.
  *G06F 21/10*    (2013.01)
(52) U.S. Cl.
  CPC ...... *G06F 21/10* (2013.01); *G06F 2221/2111* (2013.01)

(58) Field of Classification Search
  CPC ................. G06F 21/10–16; G06F 21/30–46
  See application file for complete search history.

(56) References Cited

U.S. PATENT DOCUMENTS

| | | | |
|---|---|---|---|
| 6,226,618 B1 * | 5/2001 | Downs | G06F 21/10 380/282 |
| 6,372,974 B1 | 4/2002 | Gross et al. | |
| 7,010,808 B1 | 3/2006 | Leung et al. | |
| 8,839,005 B2 * | 9/2014 | Elazar | G06F 21/10 713/194 |
| 2005/0044016 A1 * | 2/2005 | Irwin | G06Q 20/3672 705/30 |
| 2006/0107046 A1 | 5/2006 | Raley et al. | |
| 2006/0218641 A1 | 9/2006 | Koerber et al. | |
| 2006/0236097 A1 * | 10/2006 | Prologo | H04L 63/0823 713/156 |
| 2006/0282391 A1 | 12/2006 | Peterka et al. | |
| 2007/0005775 A1 | 1/2007 | Philips et al. | |
| 2007/0027814 A1 | 2/2007 | Tuoriniemi et al. | |

(Continued)

*Primary Examiner* — Neha Patel
*Assistant Examiner* — Jeffrey L Licitra
(74) *Attorney, Agent, or Firm* — Guntin & Gust, PLC; Kenneth Kwan (57) ABSTRACT

A method for transferring digital multimedia rights, the method including but not limited to requesting permission from the destination end user to transfer the digital multimedia rights to the destination end user device; and if the permission is received from the destination end user, canceling the source set of digital multimedia rights associated with the source end user and transferring the source set of digital multimedia rights associated with the source end user to the destination end user device. A system and computer program product are disclosed for performing the method.

20 Claims, 3 Drawing Sheets

(56) References Cited

U.S. PATENT DOCUMENTS

| | | | |
|---|---|---|---|
| 2007/0112678 A1 | 5/2007 | Himelfarb et al. | |
| 2007/0113081 A1* | 5/2007 | Camp | G06F 21/10 |
| | | | 713/168 |
| 2007/0143357 A1 | 6/2007 | Chaudhri et al. | |
| 2007/0185815 A1* | 8/2007 | Boccon-Gibod | G06F 21/10 |
| | | | 705/51 |
| 2007/0238448 A1* | 10/2007 | Gallagher | H04W 4/90 |
| | | | 455/414.2 |
| 2007/0271184 A1 | 11/2007 | Niebert et al. | |
| 2007/0288986 A1 | 12/2007 | Candelore et al. | |
| 2007/0299780 A1 | 12/2007 | Vanska et al. | |
| 2008/0027868 A1* | 1/2008 | Ljung | G06F 21/10 |
| | | | 705/51 |
| 2008/0228578 A1* | 9/2008 | Mashinsky | G06F 21/10 |
| | | | 705/14.54 |
| 2008/0293382 A1* | 11/2008 | Lubenski | H04L 69/08 |
| | | | 455/411 |
| 2009/0249067 A1* | 10/2009 | Lie | G06F 21/10 |
| | | | 713/167 |
| 2009/0265556 A1 | 10/2009 | Lee et al. | |
| 2009/0292809 A1 | 11/2009 | Park et al. | |
| 2009/0296936 A1* | 12/2009 | Lie | H04L 9/083 |
| | | | 380/277 |
| 2011/0179500 A1* | 7/2011 | Manning | G06F 21/10 |
| | | | 726/31 |
| 2018/0165425 A9 | 6/2018 | Wohlert et al. | |

* cited by examiner

FIG. 3

SYSTEM AND METHOD FOR PROVIDING MULTIMEDIA DIGITAL RIGHTS TRANSFER

CROSS REFERENCE TO RELATED APPLICATIONS

This application is a continuation of U.S. patent application Ser. No. 13/667,579 filed on Nov. 2, 2012, which is a continuation of U.S. patent application Ser. No. 12/693,521 filed on Jan. 26, 2010 (now U.S. Pat. No. 8,312,158). The contents of each of the foregoing are hereby incorporated by reference into this application as if set forth herein in full.

FIELD OF THE DISCLOSURE

The present disclosure relates to the transfer of digital multimedia rights.

BACKGROUND OF THE DISCLOSURE

Digital rights management (DRM) is a generic term for access control technologies that can be used by hardware manufacturers, publishers, copyright holders and individuals to try to impose limitations on the usage of digital content and devices. The term is used to describe any technology which inhibits uses (legitimate or otherwise) of digital content that were not desired or foreseen by the content provider. The term generally doesn't refer to other forms of copy protection which can be circumvented without modifying the file or device, such as serial numbers or keyfiles. It can also refer to restrictions associated with specific instances of digital works or devices. A user's multimedia digital rights (e.g. television service package) are usually associated with a single device or a fixed location, for example the user's home television set top box. Thus when a person leaves home they leave their digital multimedia rights behind.

DETAILED DESCRIPTION

This disclosure describes an illustrative embodiment that enables a user's Multimedia Digital Rights (e.g. for Video) to follow them to other locations, for example when visiting a friend's home, or in a hotel while traveling. Components include the owner's end user devices (fixed and mobile) as well as core network of service providers. System, methods and computer program components are described herein for supporting a Multimedia Digital Rights transfer request, authorization, validation, provisioning, and canceling. Consideration is provided for manual as well as automatic transfer and re-provisioning of multimedia digital rights to other location and other end user devices, which may take into consideration information regarding an end user's change of location.

In another particular illustrative embodiment, a method for transferring digital multimedia rights is disclosed, the method including but not limited to receiving at a digital multimedia rights server, from a source end user device associated with a source end user, a request for a transfer of a source set of digital multimedia rights associated with the source end user; determining a destination end user associated with a destination end user device to which the digital multimedia rights will be transferred; requesting permission from the destination end user to transfer the digital multimedia rights to the destination end user device; and if the permission is received from the destination end user, canceling the source set of digital multimedia rights associated with the source end user and transferring the source set of digital multimedia rights associated with the source end user to the destination end user device. In another particular embodiment of the method, the transferring further includes but is not limited to merging the source set of digital multimedia rights with a destination set of digital multimedia rights associated with destination end user at the destination end user device.

In another particular embodiment of the method, the method further includes but not limited to automatically transferring the source set of digital multimedia rights to the destination end user device when an end user device associated with the source end user device designated by the source end user in a source end user profile, moves physically proximate to an end user device physical location associated with the destination end user. In another particular embodiment of the method, the transferring the digital multimedia rights further includes but is not limited to transferring to the destination end user device, less than all of the digital multimedia rights associated with the source end user.

In another particular embodiment of the method, the method further includes but not limited to generating an inter carrier transfer data token including but not limited to data indicating the source end user, source end user device, source end user carrier, source end user digital multimedia rights and destination end user; and sending the inter carrier transfer token data to an inter carrier token server for arbitration and transfer of the source digital multimedia rights to the destination end user device, wherein the source end user carrier is different from a carrier for the destination end user.

In another illustrative embodiment, a computer program product useful for transferring digital multimedia rights is disclosed, the computer program product including but not limited to a computer readable medium; a computer program including but not limited to computer executable instructions embedded in the computer readable medium, the computer program further including but not limited to instructions to receive at a digital multimedia rights server, from a source end user device associated with a source end user, a request for a transfer of a source set of digital multimedia rights associated with the source end user; instructions to determine a destination end user associated with a destination end user device to which the digital multimedia rights will be transferred; instructions to request permission from the destination end user to transfer the digital multimedia rights to the destination end user device; and instructions to, if the permission is received from the destination end user, cancel the source set of digital multimedia rights associated with the source end user and transferring the source set of digital multimedia rights associated with the source end user to the destination end user device.

In another particular embodiment of the computer program product, the instructions to transfer further include but not limited to instructions to merge the source set of digital multimedia rights with a destination set of digital multimedia rights associated with destination end user at the destination end user device. In another particular embodiment of the computer program product, the computer program further including but not limited to instructions to automatically transferring the source set of digital multimedia rights to the destination end user device when an end user device associated with the source end user device designated by the source end user in a source end user profile, moves physically proximate to an end user device physical location associated with the destination end user. In another particular embodiment of the computer program product, the instructions to transfer the digital multimedia rights further include but not limited to instructions to transfer to the destination end user device, less than all of the digital multimedia rights associated with the source end user.

In another particular embodiment of the computer program product, the computer program further includes but is not limited to instructions to generate an inter carrier transfer data token including but not limited to data indicating the source end user, source end user device, source end user carrier, source end user digital multimedia rights and destination end user; and instruction to send the inter carrier transfer token data to an inter carrier token server for arbitration and transfer of the source digital multimedia rights to the destination end user device, wherein the source end user carrier is different from a carrier for the destination end user.

In another illustrative embodiment, a system useful for transferring digital multimedia rights is disclosed, the system including but not limited to a processor; a computer readable medium; and a computer program including but not limited to computer executable instructions embedded in the computer readable medium, the computer program further including but not limited to instructions to receive at a digital multimedia rights server, from a source end user device associated with a source end user, a request for a transfer of a source set of digital multimedia rights associated with the source end user; instructions to determine a destination end user associated with a destination end user device to which the digital multimedia rights will be transferred; instructions to request permission from the destination end user to transfer the digital multimedia rights to the destination end user device; and instructions to, if the permission is received from the destination end user, cancel the source set of digital multimedia rights associated with the source end user and transferring the source set of digital multimedia rights associated with the source end user to the destination end user device. In another particular embodiment of the system, instructions to transfer further include but not limited to instructions to merge the source set of digital multimedia rights with a destination set of digital multimedia rights associated with destination end user at the destination end user device. In another particular embodiment of the system, the computer program further including but not limited to instructions to automatically transferring the source set of digital multimedia rights to the destination end user device when an end user device associated with the source end user device designated by the source end user in a source end user profile, moves physically proximate to an end user device physical location associated with the destination end user. In another particular embodiment of the system, the instructions to transfer the digital multimedia rights further include but not limited to instructions to transfer to the destination end user device, less than all of the digital multimedia rights associated with the source end user.

In another particular embodiment of the system, the computer program further including but not limited to instructions to generate an inter carrier transfer data token including but not limited to data indicating the source end user, source end user device, source end user carrier, source end user digital multimedia rights and destination end user; and instruction to send the inter carrier transfer token data to an inter carrier token server for arbitration and transfer of the source digital multimedia rights to the destination end user device, wherein the source end user carrier is different from a carrier for the destination end user.

Figure 1:
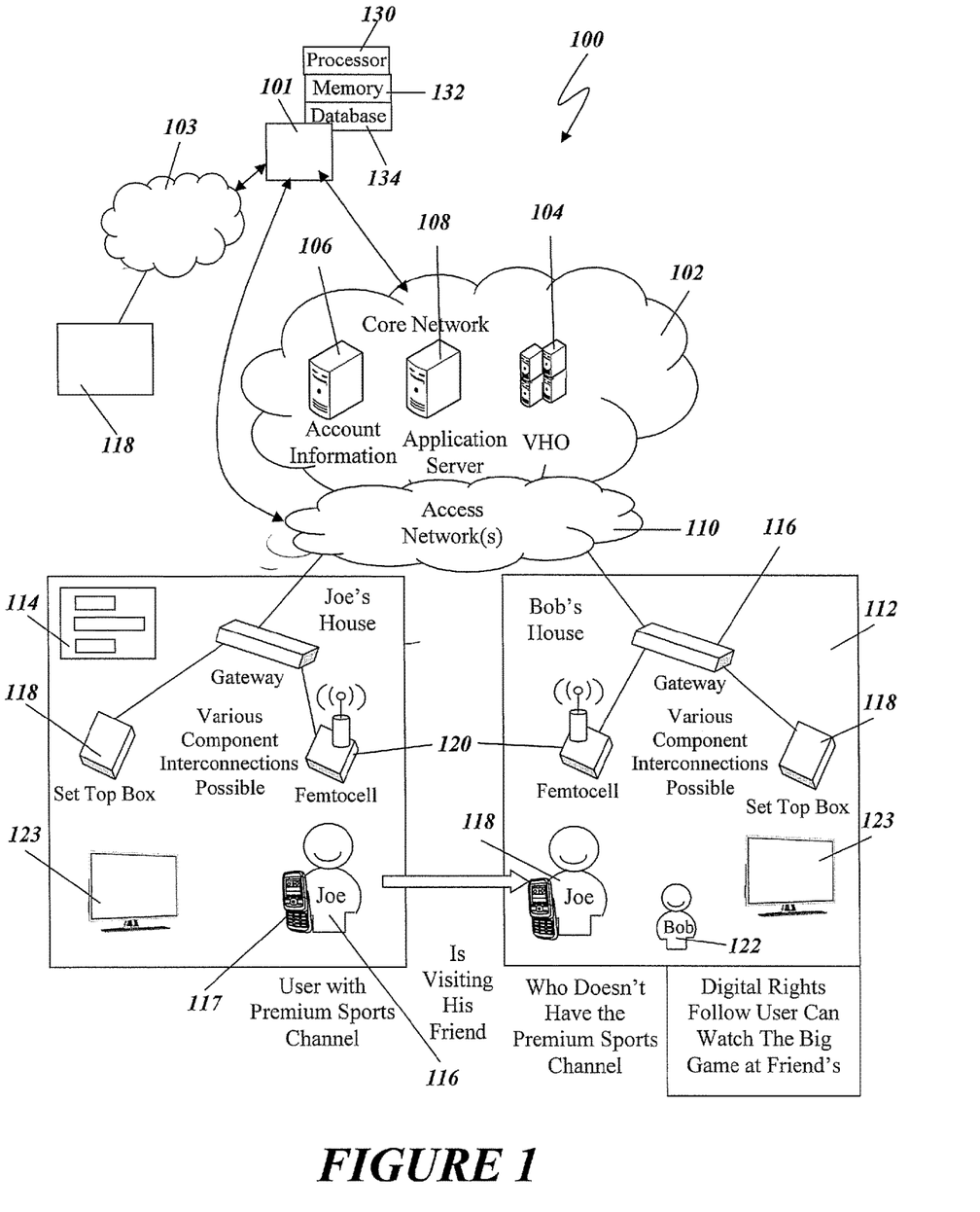
FIG. 1 depicts an illustrative embodiment of a system for transferring digital multimedia rights data.

Turning now to FIG. 1, in an illustrative embodiment an internet protocol television (IPTV) network 102 including but not limited to a vide head office (VHO) 104, a digital rights media server 108 and end user profile server 106. Each server and end user device in this disclosure are equipped with an processor 130, computer readable memory 132 and data base 134 for arranging data used by the processor and stored in the computer readable medium.

The end user profile server contains a data base 134 of end user profiles that indicates the identify of each end user in the IPTV system, one or more end user devices associated with each of the end users and digital rights management data indicating what digital rights are granted to each end user on each end user device. For example, an end user Joe 116 has a television subscription package from his service provider that includes a premium sports channel. It's Saturday afternoon, Joe is at his friend. Bob's 122 house, and they both really want to watch the big game that is about to be aired. Bob has the same television service provider as Joe, but doesn't subscribe to the premium sports channel, which is needed to watch the game. Joe runs an application of an illustrative embodiment of the present invention on his cell phone 117 that requests his digital rights service package to be made available by his service provider at Bob's house. In an illustrative embodiment, the application is very user friendly. The application knows Joe's identity, and deduces where Joe wants his digital rights transferred on the basis of Joe's location (which the application deduces from Joe's cell phone.) Joe's service provider authenticates and validates Joe' request to transfer his digital rights to an end user device such as a set top box at Bob's house.

The service provider identifies Bob and sends a message to Bob's current end user device, such as the set top box 118 at Bob's house. Bob receives a pop up message on his set top box display 123, typically a television asking if Bob accepts letting Joe transfer Joe's multimedia digital rights, and Bob agrees by responding to the pop menu via his television remote control. The service provider manages the needed provisioning adjustments in the service provider data base 134 at the IPTV network for end user profiles which includes but is not limited to the digital right grants for all end users, including Bob and Joe. The service provider via digital rights transfer server 108 then grants the digital rights transfer. This makes Joe's digital rights available on Bob's television (in addition to Bob's rights which are temporarily merged with Joe's in the service provider database). At essentially the same time, Joe's multimedia digital rights that have been transferred to Bob's house are suspended at Joe's house. Joe happily gets to watch the big game. When Joe's leaves Sam's house, the digital rights transfer is cancelled as Bob's house and re-provisioned as enable back at Joe's house. In another illustrative embodiment, Joe can transfer a subset of his digital rights to Bob's house, for example, transferring only the sports package to Bob's house and leaving the multimedia digital rights to the movie package at home for his wife to watch a movie on the movie package, while Joe is at Bob's house watching the game.

In another illustrative embodiment, Joe can select a particular multimedia digital right to a particular end user device, associated with himself or with another end user. Thus, Joe can transfer the sports package on his home set top box to his cell phone or to Bob's cell phone so that they can watch the big football game from a mobile location. In another illustrative embodiment, Joe and Bob have different service providers 102 and 103 respectively, for their cell phones and their internet/multimedia providers. In this case, a request for a transfer of multimedia digital rights generates an inter carrier token that goes through a inter carrier service exchange server 106 or to identify Joe and Bob's carriers and allows both carriers to participate by re-provisioning and de-provisioning Joe's digital multimedia rights when he requests a transfer of his digital multimedia rights to Bob's set top box or to Bob's or his own cell phone.

Thus, a request to transfer digital multimedia rights received by a first carrier 102 for rights to be transferred to a second carrier 103 is handled by a inter carrier data token generated by the first carrier. The inter carrier data token contains data that indicates a source end user (Joe) and destination end user (Sam), their carrier affiliation and the source and destination's end users' digital multimedia rights. Thus carrier A receives a request from Joe to transfer rights to Bob's set top box which is serviced by carrier B. Carrier A generates a transfer request message including inter carrier exchange data toke and sends it to the inter carrier exchange server 101 which decodes the token data and informs carrier B of the transfer request. Thus carrier A and carrier B communicate with the inter carrier exchange token server to carry out the transfer of digital multimedia rights from Joe's set top box to Bob's set top box or Bob's cell phone.

In a particular illustrative embodiment, a system is provided including but not limited to several components, which support functions to collectively provide the service functionality provided in a particular illustrative embodiment. In various particular embodiments, different computer programs and methods may be used to enable functionality in the components and end user devices. Components and end user devices include but are not limited to the user devices (e.g. Netbook, Cell Phone, PC, etc.), the service provider's Access Network 110 (e.g., set top box, home gateway 116, femtocell 120, etc.), and the service provider's Core Network (e.g. Video Application Server, Customer Service Profile, Video Head Office, etc.). Key functions for which methods are provided include but are not limited to enabling a multimedia digital rights transfer request from the user to the service provider. This transfer request may be manually invoked by the end user from an end user device, or automatically triggered, for example, when an end user has indicated in their service profile in the end user profile in the service provider's data base and the accessible from the inter service providers token server, that whenever I'm (a first end user) is at Bob's House (a second end user), please transfer some or all of my multimedia digital rights to Bob's set top box (a first end user device for the second end user) house or Bob's cell phone (a second end user device for the second end user). Some or all of an end user's multimedia digital rights may be transferred, depending on the end user's preferences. Authenticating, and validating the multimedia Digital Rights transfer request. Validation may include confirming the location of the user. Acceptance of the multimedia Digital Rights Transfer Request by the destination user.

Figure 2:
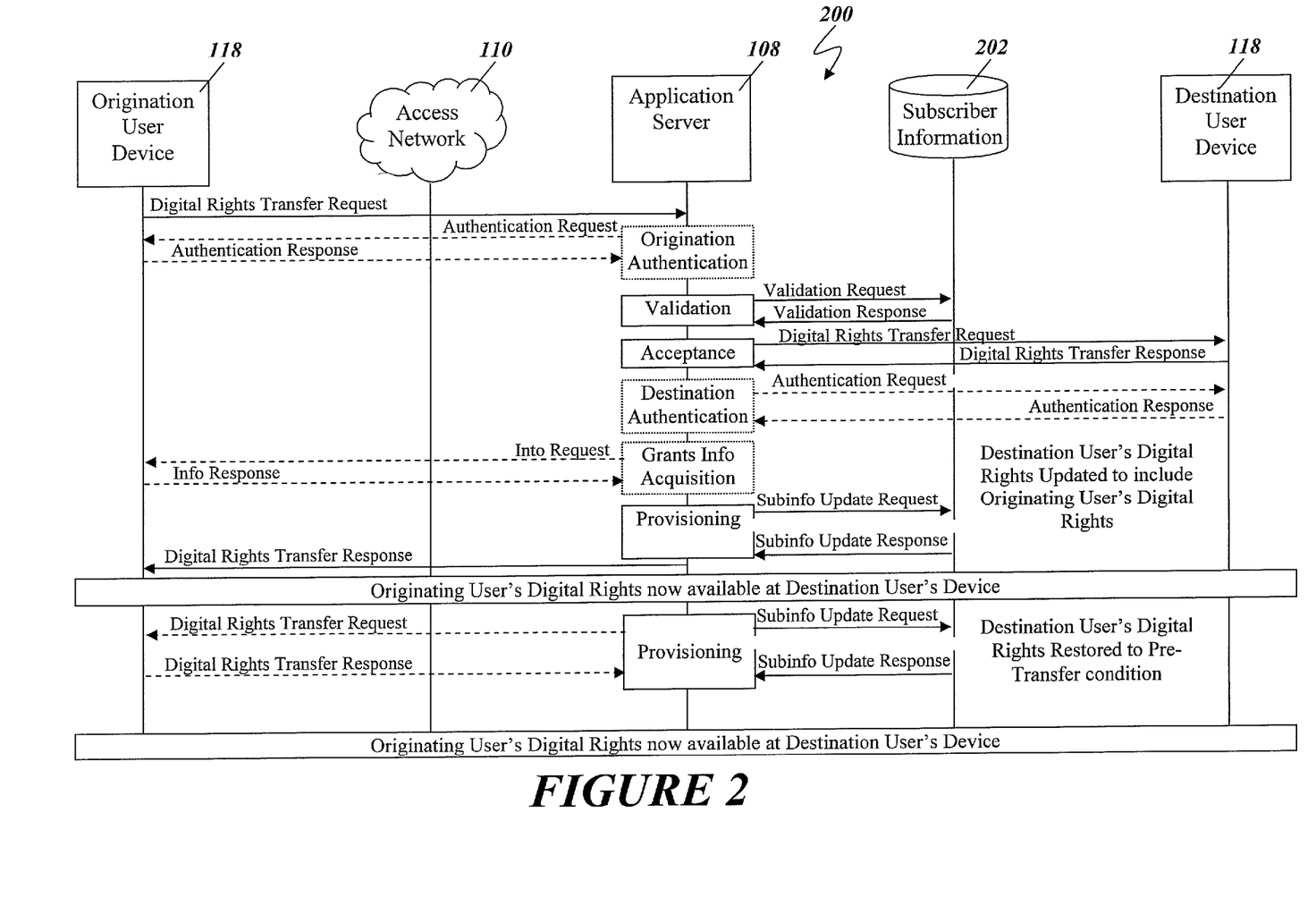
FIG. 2 depicts an illustrative embodiment of a system for transferring digital multimedia rights data.

The request is be agreed upon by the party (Sam) to whom the multimedia digital rights are being transferred. Provisioning the multimedia digital rights transfer by the service provider. The first end user's multimedia digital rights may be merged with the multimedia digital rights of the visited friend, the second end user. The first end user's multimedia digital rights transfer may be terminated manually by the first or second end user, on the basis of duration, or (automatically) when the first end user leaves his friend's house, the second end user. Turning now to FIG. 2, as shown in FIG. 2, an illustrative message exchange scenario 200 is depict in which the source end user's digital rights transfer is initiated by a digital rights transfer request being sent from the user to the user's service provider. Information provided in the digital rights transfer request can include the following origination identification e.g. the first or source end user's account name, e.g. the source end user's cell phone identity (e.g. MSISDN). MSISDN is a number uniquely identifying an end user subscription in a GSM or UMTS mobile network. Simply put, it is the telephone number to the SIM card in a mobile/cellular phone. The abbreviation has several interpretations, most common one being "Mobile Subscriber Integrated Services Digital Network Number. The MSISDN together with IMSI are two important numbers used to identify a mobile subscriber. The former identifies the SIM, i.e. the card that is inserted into the mobile phone, while the latter is used to route calls to the subscriber. IMSI is often used as a key in the HLR ("subscriber database") and MSISDN is the number normally dialed to connect a call to the mobile phone. A SIM is uniquely associated to an IMSI, while the MSISDN can change in time (e.g. due to number portability), i.e. different MSISDNs can be associated to the SIM.

If the source end user's cell phone identity is used, a mapping may be needed by the service provider between the cell phone identity and the identity used for television subscription rights. When the cell phone service provider (carrier) and television service provider (carrier) are different carriers, an inter carrier data token is generated by the carrier receiving the transfer request, identifying the source and destination end users, television a
and cell phone carriers, transfer request data indicating what rights are being transfer and to where (end user, end user device) and sent to the inter carrier server.

The inter carrier server functionality, including but not limited to a computer program product having a computer program of computer executable instructions embedded in a computer readable medium at the inter carrier server, arbitrates between carriers which re-provision and de-provision digital multimedia rights based on the transfer request defined in the inter carrier data token. It may be preferable for the Originating Identification to be provided as the television subscription identity for an end user profile for the source or requesting end user. Security Information e.g. a PIN, e.g. social security number, Destination Identification, e.g. the friend's account name (destination end user) e.g. the friend's address, e.g. the friend's cell phone identity (e.g. MSISDN), e.g. the user's current location (address or geographic coordinates), the service provider may require the user to be at the destination location. Default values for some or all of the needed information may be automatically provided. If the digital rights transfer request is made by user on the source end user's cell phone (e.g. using a client computer program in the cell phone), the client computer program may know some or all of the needed information (e.g. end user's identity, security information, destination=current location).

The digital rights transfer request can be originated by the first or source end user by any one of several methods, including using a mobile device (e.g. cell phone, net book) or fixed device (e.g. wireline phone) to call an interactive voice responder (IVR) provided by the service provider. The user identity may be automatically provided (e.g. calling party identity information), or may be manually provided by the user security information may be manually or verbally provided by the user, the service provider may know or be able to derive the user's location (mobile location) e.g. due to the user's cell phone's location e.g. registration on Bob's femtocell, attachment to WiFi access point, e.g. base station triangulation, e.g. GPS coordinates the correlation between the user's location and the destination (friend's address, identity). Using an application (e.g. widget, or client, or browser) that resides in a device (e.g. cell phone, net book, laptop, PC, IPTV, etc.) that may belong to the user or the user's friend and communicates with a server in the service provider's network (e.g. access network, core network, web, etc.). In telecommunications, a femtocell, originally known as an Access Point Base Station—is a small cellular base station, typically designed for use in a home or small business. It connects to the service provider's network via broadband (such as DSL or cable); current designs typically support 2 to 4 active mobile phones in a residential setting. A femtocell allows service providers to extend service coverage indoors, especially where access would otherwise be limited or unavailable.

Note that an application (client program) running on the user's cell phone is attractive because the user is likely to have the cell phone or other portable device with them when they are away from their home, and this approach doesn't impose any requirements on the visited user's devices. Note that the application could be intelligent, know or predict the desired information, and provide the needed information with minimal or no interaction with the user. For example, the application may be able to determine or deduce the origination Identification information as the identity of the owner of the device upon which the request is being originated (e.g. the user's cell phone). Security Information as previously provided and securely stored (encrypted, etc.) on the originating user's device. Destination Identification as a function of the user's current location, or last used destination, or cyclic calendar information (recurring event), or other information previously provided by the user. If, for example, the digital multimedia rights transfer request is provided from an application on the source end user user's cell phone, and the source end user's cell phone is registered on the friend's (destination end user) femtocell, it may be deduced that the originating identification information is that of the cell phone user (source end user), the security information is that of the cell phone user, the destination identification information is that of the femtocell owner. In this particular scenario, no information needs to be manually entered by the user. Furthermore, the service provider may automatically offer the digital rights transfer service to the user when their cell phone registers on their friend's femtocell. The desired functionality may be implemented using a client—server model whereby user interfacing functionality is provided by a client that runs in a user device, and service provider functionality is provided by one or more network based application servers.

The digital rights transfer request for an end user can be automatically originated by the service provider, for example based on the end user preferences indicated in the an service providers data base containing end user profiles regarding digital multimedia rights grants. For example, the requesting or source end user may (by one of several methods, such as usage of a web portal) indicate to their service provider (as part of their service profile) to automatically transfer their digital multimedia rights to a given destination under certain circumstances such as presence information.

When a digital rights transfer request is received by the service provider, the service provider may wish to authenticate and validate the request with either or both the originating and destination users. Authentication may require the provision of a password or other 'secret' information as part of the digital multimedia rights transfer request. Validation involves confirming that the user has usage of the service. For example, if the service provider offers the service for a fee, and the user hasn't paid the fee, then the user may not be able to use the service unless they subscribe to the service or pay a fee. The fee could be recurring, or one time, or pay per use, etc.

A variety of methods may be used to enable the destination end user to whom the multimedia digital rights are being transferred to accept the transfer at an end user device with which the destination end user is associated. The acceptance of the transfer can occur on a first end user device associated with the destination end user to allow a transfer to a second end user device associated with the destination end user. These include the following a network originated (e.g. interactive voice responder (IVR)) call to the destination end user, announcing, e.g. 'Joe has requested transfer of his television package rights to your television service. Please press 1 to accept the request, or 2 to deny the request, or 3 to speak to a service representative'. A network originated prompt to the destination user's television, e.g. 'Joe has requested transfer of his television package rights to your television service. Please press Enter' to accept the request, or 'Cancel' to deny the request. A pop up window on the destination user's PC, laptop, or netbook. This may be especially appropriate if the Transfer Request was originated from a device on the destination user's home network (e.g. the destination user's PC). The destination party may need to provide security information prior to accepting the transfer request.

Within an internet protocol television (IPTV) domain, every household has a set of grants, rights that give it packages. An Application Server (AS) can query what subscribers' rights are, and can set them. Therefore a Video Application Server can: Receive a request for digital multimedia rights transfer from a source end user. Authenticate the source end user to determine that the source end user is indeed who they say they are; Validate the request to confirm that the source end user has the rights they are requesting to transfer, for example, their account is currently paid and not in arrears; Query the source end user end user or subscriber's service profile to ensure they have the service; Query the originating source end user/subscriber's grants to ensure they have the rights they are requesting to transfer. Determine if the source end user wants to transfer all or subset of their grants. Query and store the destination subscriber's digital rights grants (for later restoring or current merging of the destination end user's digital multimedia rights with the source end user's transferred grants of digital multi-media rights).

In a particular illustrative embodiment, the originating end user digital multimedia rights transferred grants are added to or merged with the destination end user digital multimedia rights grants. Upon cancellation, an illustrative embodiment restores the destination end user subscriber's grants as they originally were and restored the source end user's rights as they existed before the transfer. All rights transferred from the source end user are temporarily suspended at the source end user until the transfer is terminated. In another illustrative embodiment, a source end user can pay for an extension or digital multimedia rights so that the source end user can transfer some or all of their digital multimedia rights which paying to maintain the transferred digital multimedia rights at the source end user's end user device.

When the digital rights transfer request is received by the IPTV video application server, the application server may determine the difference between the originating user's service set of digital multimedia rights, and the destination user's service set of digital multimedia rights; and add the difference to the destination user's service set. An illustrative embodiment also offers the originating user a selection of which services should be transferred. Note that with this approach, the originating source end user's digital multimedia rights don't simply overwrite the destination end user's digital multimedia rights. For example, if a pay for view movie is ordered at the destination user's home after the visitor's rights transfer has taken place, the destination user is still the responsible billing party. Additionally, the destination user doesn't lose any of the rights they had. The resultant set of rights is a merger of the destination user's rights plus additional rights from the originating user. As a simpler alternative, the originating user's digital rights may overwrite the destination user's rights. However this approach may result in the destination user being deprived of rights they would like to retain, and as such be less attractive than an approach that merges all or part of the originating user's rights with the destination party's rights. However, with the over writing approach the originating user could be responsible for any additional, e.g. pay per view, charges incurred.

The digital multimedia rights transfer can be manually cancelled using the same or similar methods as those used to request the transfer, or may automatically cancelled, for example as a function of the end user's end user device location. For example: When Joe leaves Bob's house, Joe's cell phone de-registers from Bob's femtocell and registers with a macro cell or cell tower provided by Joe's cell phone carrier. The de-registration can be detected in the cell phone, reported, and terminate the digital multimedia rights transfer. The de-registration can be detected in the femtocell, reported, terminate the digital multimedia rights transfer. The macro cell registration can be detected in the IPTV system, reported, and used to initiate termination of the digital multimedia rights transfer. The digital multimedia rights transfer could also be cancelled as a function of duration expiration. For example, duration could be expressed in the transfer request, and when that amount of time is over, the transfer is cancelled. As an option, when the transfer is cancelled, the originating party could be queried to determine if they would like to extend the duration of the transfer. If unacknowledged, the transfer would be cancelled.

FIG. 2 provides an exemplary functional message flow between components of a system for enabling multimedia digital rights transfer. FIG. 2 depicts messages and data transferred between a source end user device 118, an access network 110, a digital rights transfer server 108, an end user profile data base 134 an destination end user device. The previously identified service examples provide instances of video streaming based on content from a service provider. However it may also be possible to stream content from the user's DVR (for which the user owns digital rights) to a remote terminal. Here is an example of an illustrative use case as an extension of the previously provided scenario where Kathy visits her mother, and her digital rights automatically follow her: Kathy visits her mother every Saturday afternoon from approximately noon until 3 PM.—They both love the Mother Nature show that Kathy subscribes to, but her mother doesn't. Kathy has a illustrative embodiment of the system, method and computer program product described herein, which is also referred to herein as "the Follow Me service" from her service provider. She uses her service provider's friendly web portal to have her television package transferred to her mother's house whenever she is there. Her mother agrees to this. On Saturday, Kathy arrives at her mother's house. Kathy's cell phone location is known to the service provider (e.g. by its registration on her mother's femtocell, or by base station triangulation, or by GPS coordinates, or other means), and reported to the video application server (e.g. a 'watcher' of Kathy's location). Kathy's multimedia digital rights are automatically transferred to her mother's house. Kathy and her mother start to watch the current Mother Nature show, but her mother missed the previous show and would like to watch it. Kathy has it recorded on her U-Verse DVR back at her home. Kathy can have the content on her U-Verse DVR (to which she owns digital rights) streamed not to her TV, but to her Mother's TV.

Kathy and her mother watch the previous Mother Nature show, streamed from Kathy's home DVR. Kathy goes back home. When Kathy leaves her Mother's home, the content from her home DVR can no longer be streamed to her Mother's home.

Figure 3:
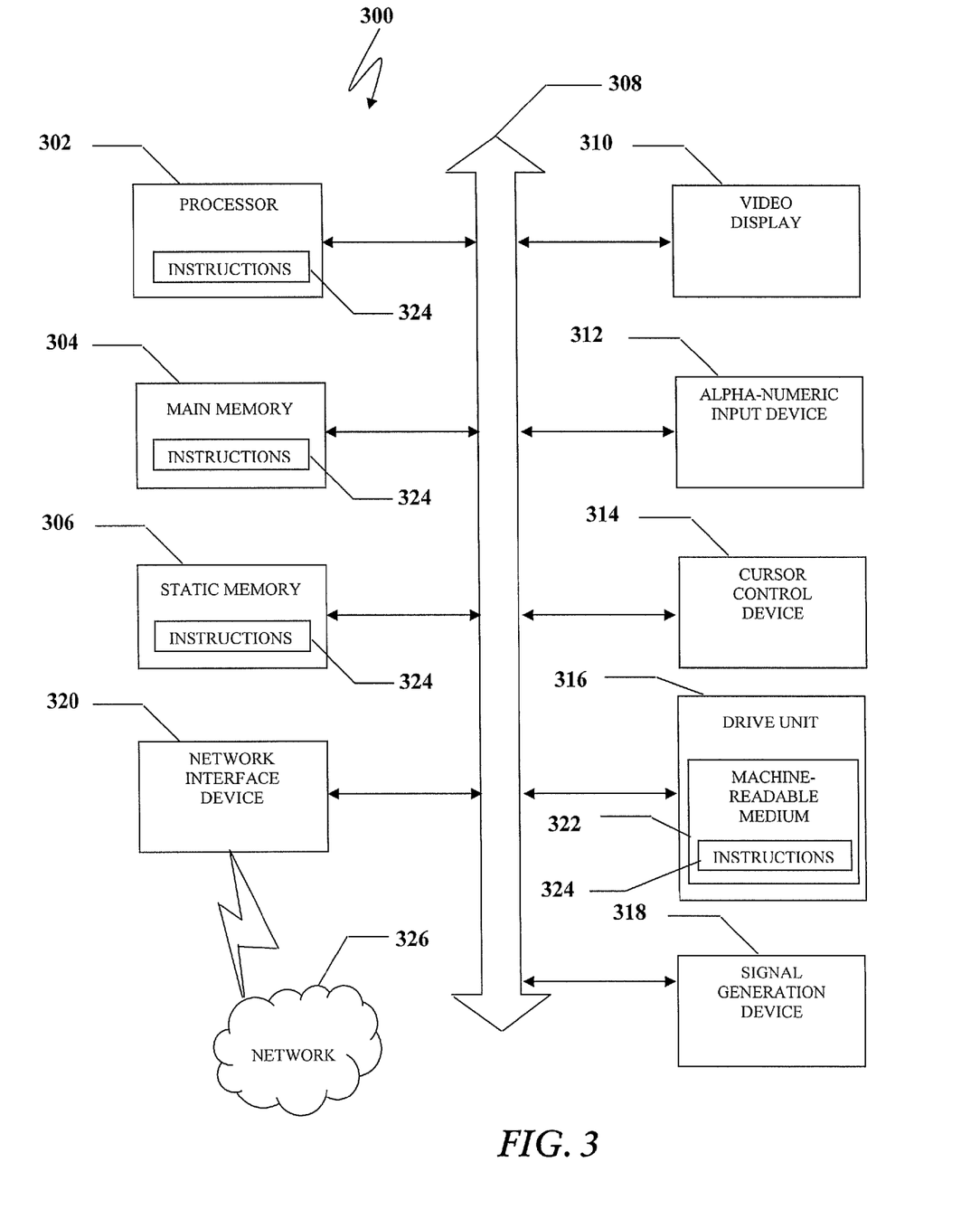
FIG. 3 is an illustrative embodiment of a machine for performing functions disclosed in an illustrative embodiment.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., liquid crystals display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320. The machine readable medium may also contain a data structure for containing data useful in providing a functional relationship between the data and a machine or computer in an illustrative embodiment of the disclosed system and method.

While the machine-readable medium 322 is shown in an example embodiment to be a single medium, the term "machine-readable medium" should be taken to include a single medium or multiple tangible media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device in communication with a source end user device and a destination end user device for digital multimedia rights management, comprising:
  a processing system including a processor; and a memory that stores executable instructions that, when executed by the processing system, facilitate performance of operations, the operations comprising:

identifying, among a set of digital multimedia rights associated with a source end user of the source end user device but not associated with a destination end user of the destination end user device, a subset of digital multimedia rights, the subset of digital multimedia rights comprising digital multimedia rights to be transferred from the source end user device to the destination end user device according to a user selection provided to the source end user device;

providing a network originated message to the destination end user device, wherein the network originated message comprises an offer to transfer the subset of digital multimedia rights to the destination end user device;

based on a message received from the destination end user device, detecting an acceptance of the offer;

determining that the source end user device has moved into physical proximity to an end user device physical location associated with the destination end user device, wherein the determining is based on identifying that the source end user device has registered with a femtocell at the end user device physical location;

automatically transferring the subset of digital multimedia rights to the destination end user device according to the detecting the acceptance of the offer, according to the determining that the source end user device has moved into physical proximity to the end user device physical location associated with the destination end user device, and according to an indication, provided by the source end user, in an end user profile associated with the source end user that the source end user instructs to trigger an automatic transfer of digital multimedia rights when the source end user device is located at the end user device physical location, wherein the automatically transferring the subset of digital multimedia rights comprises removing, from the end user profile associated with the source end user, digital rights grants for the subset of digital multimedia rights, wherein the automatically transferring the subset of digital multimedia rights to the destination end user device enables the destination end user device to access content via streaming that is stored at a storage device and enables presenting the content at the destination end user device, wherein the storage device is remote from the source end user device and the destination end user device, wherein the content is previously recorded and stored according to user input, and wherein the automatically transferring comprises overwriting a particular set of digital multimedia rights associated with the destination end user device with the digital rights grants for the subset of digital multimedia rights or merging the digital rights grants for the subset of digital multimedia rights with the particular set of digital multimedia rights associated with the destination end user device;

detecting a user command from the destination end user device to present a pay per presentation content item at the destination end user device, wherein the subset of digital multimedia rights is for a package of content, and wherein the pay per presentation content item comprises an additional desired content item that is not included in the package of content and that is subject to a separate additional charge;

in response to the detecting the user command to present the pay per presentation content item at the destination end user device, causing the pay per presentation content item to be presented at the destination end user device;

in response to the causing the pay per presentation content item to be presented at the destination end user device:

assessing the separate additional charge for the pay per presentation content item to a first account associated with the source end user device and not to a second account associated with the destination end user device, if the automatically transferring is performed by overwriting the particular set of digital multimedia rights associated with the destination end user device with the digital rights grants for the subset of digital multimedia rights; and assessing the separate additional charge for the pay per presentation content item to the second account associated with the destination end user device and not to the first account associated with the source end user device, if the automatically transferring is performed by merging the digital rights grants for the subset of digital multimedia rights with the particular set of digital multimedia rights associated with the destination end user device;

subsequent to the automatically transferring the subset of digital multimedia rights to the destination end user device, determining that the source end user device has moved out of the physical proximity to the end user device physical location;

responsive to the determining that the source end user device has moved out of the physical proximity to the end user device physical location, automatically withdrawing the subset of digital multimedia rights from the destination end user device, wherein the determining that the source end user device has moved out of the physical proximity to the end user device physical location is in accordance with both a received indication, from the femtocell, that the source end user device has de-registered from the femtocell at the end user device physical location and a received indication, from an Internet Protocol Television (IPTV) network, that the source end user device has registered with a mobile carrier cell system; and restoring the particular set of digital multimedia rights of the destination end user device to a state that existed before the automatically transferring occurred.

2. The device of claim 1, wherein the determining that the source end user device has moved into physical proximity to the end user device physical location associated with the destination end user device is based on cyclic calendar information associated with the source end user, wherein the automatically transferring the subset of digital multimedia rights comprises adjusting an end user profile associated with the destination end user, and wherein the operations further comprise, subsequent to the automatically transferring the subset of digital multimedia rights, causing a query to be provided to the source end user regarding extending a duration of transfer of the subset of digital multimedia rights, and terminating the transfer of the subset of digital multimedia rights if the query is not acknowledged.

3. The device of claim 2, wherein the automatically transferring the subset of digital multimedia rights comprises adding, to the end user profile associated with the destination end user, the digital rights grants for the subset of digital multimedia rights.

4. The device of claim 1, the operations further comprising sending an inter carrier transfer data token to an inter carrier token server responsive to a determination that a carrier for the destination end user differs from a carrier for the source end user.

5. The device of claim 4, wherein the inter carrier transfer data token comprises data indicating the source end user, the carrier for the source end user, the subset of digital multimedia rights, and the destination end user.

6. The device of claim 1, wherein the source end user device is a mobile device and the destination end user device is a set top box.

7. The device of claim 1, wherein the operations further comprise identifying the subset of digital multimedia rights based on a request message received from the source end user device.

8. A method for transferring digital multimedia rights by an application server in communication with a source end user device and a destination end user device, the method comprising:

identifying, by a processing system of the application server including a processor, among a set of digital multimedia rights associated with a source end user of the source end user device, a subset of digital multimedia rights comprising digital multimedia rights to be transferred from the source end user device to the destination end user device according to a user selection provided by the source end user;

causing, by the processing system, a provision to the destination end user device of an offer to transfer the subset of digital multimedia rights to the destination end user device;

detecting, by the processing system, an acceptance of the offer;

determining, by the processing system, that the source end user device has moved into physical proximity to an end user device physical location associated with the destination end user device, wherein the determining is based on identifying that the source end user device has registered with a femtocell at the end user device physical location;

based upon the detecting the acceptance of the offer, based upon the determining that the source end user device has moved into physical proximity to the end user device physical location associated with the destination end user device, and based upon detecting an indication, provided by the source end user, in an end user profile associated with the source end user that the source end user instructs to trigger an automatic transfer of digital multimedia rights when the source end user device is located at the end user device physical location, automatically transferring, by the processing system, the subset of digital multimedia rights to the destination end user device, wherein the automatically transferring the subset of digital multimedia rights comprises removing, from the end user profile associated with the source end user, digital rights grants for the subset of digital multimedia rights, wherein the automatically transferring the subset of digital multimedia rights to the destination end user device enables the destination end user device to access content via streaming that is stored at a storage device and enables presenting the content at the destination end user device, wherein the storage device is remote from the source end user device and the destination end user device, wherein the content is previously recorded and stored according to user input, and wherein the automatically transferring comprises overwriting a particular set of digital multimedia rights associated with the destination end user device with the digital rights grants for the subset of digital multimedia rights or merging the digital rights grants for the subset of digital multimedia rights with the particular set of digital multimedia rights associated with the destination end user device;

detecting, by the processing system, a user command from the destination end user device to present a pay per presentation content item at the destination end user device, wherein the subset of digital multimedia rights is for a package of content, and wherein the pay per presentation content item comprises an additional desired content item that is not included in the package of content and that is subject to a separate additional charge;

in response to the detecting the user command to present the pay per presentation content item at the destination end user device, causing, by the processing system, the pay per presentation content item to be presented at the destination end user device;

in response to the causing the pay per presentation content item to be presented at the destination end user device:
assessing, by the processing system, the separate additional charge for the pay per presentation content item to a first account associated with the source end user device and not to a second account associated with the destination end user device, if the automatically transferring is performed by overwriting the particular set of digital multimedia rights associated with the destination end user device with the digital rights grants for the subset of digital multimedia rights;
assessing, by the processing system, the separate additional charge for the pay per presentation content item to the second account associated with the destination end user device and not to the first account associated with the source end user device, if the automatically transferring is performed by merging the digital rights grants for the subset of digital multimedia rights with the particular set of digital multimedia rights associated with the destination end user device;

subsequent to the automatically transferring the subset of digital multimedia rights to the destination end user device, determining, by the processing system, that the source end user device has moved out of the physical proximity to the end user device physical location;

responsive to the determining that the source end user device has moved out of the physical proximity to the end user device physical location, automatically withdrawing, by the processing system, the subset of digital multimedia rights from the destination end user device, wherein the determining that the source end user device has moved out of the physical proximity to the end user device physical location is in accordance with both a received indication, from the femtocell, that the source end user device has de-registered from the femtocell at the end user device physical location and a received indication, from an Internet Protocol Television (IPTV) network, that the source end user device has registered with a mobile carrier cell system; and restoring, by the processing system, the particular set of digital multimedia rights of the destination end user device to a state that existed before the automatically transferring occurred.

9. The method of claim 8, further comprising sending an inter carrier transfer data token to an inter carrier token server responsive to a determination, by the processing system, that a carrier for a destination end user of the destination end user device differs from a carrier for the source end user.

10. The method of claim 9, wherein the inter carrier transfer data token comprises data indicating the source end user, the carrier for the source end user, the subset of digital multimedia rights, and the destination end user.

11. The method of claim 8, wherein the source end user device is a mobile device and the destination end user device is a set top box.

12. The method of claim 8, wherein the determining that the source end user device has moved into physical proximity to the end user device physical location associated with the destination end user device is based on cyclic calendar information associated with the source end user, wherein the automatically transferring the subset of digital multimedia rights comprises adjusting an end user profile associated with a destination end user of the destination end user device, and wherein the method further comprises, subsequent to the automatically transferring the subset of digital multimedia rights, causing a query to be provided to the source end user regarding extending a duration of transfer of the subset of digital multimedia rights, and terminating the transfer of the subset of digital multimedia rights if the query is not acknowledged.

13. The method of claim 12, wherein the automatically transferring the subset of digital multimedia rights comprises adding, to the end user profile associated with the destination end user, the digital rights grants for the subset of digital multimedia rights.

14. The method of claim 8, further comprising identifying, by the processing system, the subset of digital multimedia rights based on a request message received from the source end user device.

15. A non-transitory, machine-readable storage medium comprising executable instructions that, when executed by a processing system including a processor of an application server in communication with a source end user device and a destination end user device for digital multimedia rights management, facilitate performance of operations, the operations comprising:
  detecting, based on a request message received from a source end user device, a selection of a subset of digital multimedia rights from among a set of digital multimedia rights associated with a source end user of the source end user device, wherein the subset of digital multimedia rights comprises digital multimedia rights that are not associated with a destination end user of a destination end user device, and wherein the selection of the subset of digital multimedia rights represents an indication that the subset of digital multimedia rights are to be transferred to the destination end user device;
  sending a message to the destination end user device, wherein the message comprises an offer to transfer the subset of digital multimedia rights to the destination end user device;
  receiving a second message comprising an acceptance of the offer;
  determining that the source end user device has moved into physical proximity to an end user device physical location associated with the destination end user device, wherein the determining is based on identifying that the source end user device has registered with a femtocell at the end user device physical location;
  automatically transferring the subset of digital multimedia rights to the destination end user device (i) in response to the receiving the second message, (ii) in response to the determining that the source end user device has moved into physical proximity to the end user device physical location associated with the destination end user device, and (iii) in response to detecting an indication, provided by the source end user, in an end user profile associated with the source end user that the source end user instructs to trigger an automatic transfer of digital multimedia rights when the source end user device is located at the end user device physical location, wherein the automatically transferring the subset of digital multimedia rights comprises removing, from the end user profile associated with the source end user, digital rights grants for the subset of digital multimedia rights, wherein the automatically transferring the subset of digital multimedia rights to the destination end user device enables the destination end user device to access content via streaming that is stored at a storage device and enables presenting the content at the destination end user device, wherein the storage device is remote from the source end user device and the destination end user device, wherein the content is previously recorded and stored according to user input, and wherein the automatically transferring comprises overwriting a particular set of digital multimedia rights associated with the destination end user device with the digital rights grants for the subset of digital multimedia rights or merging the digital rights grants for the subset of digital multimedia rights with the particular set of digital multimedia rights associated with the destination end user device;
  detecting a user command from the destination end user device to present a pay per presentation content item at the destination end user device, wherein the subset of digital multimedia rights is for a package of content, and wherein the pay per presentation content item comprises an additional desired content item that is not included in the package of content and that is subject to a separate additional charge;
  in response to the detecting the user command to present the pay per presentation content item at the destination end user device, causing the pay per presentation content item to be presented at the destination end user device;
  in response to the causing the pay per presentation content item to be presented at the destination end user device:
    assessing the separate additional charge for the pay per presentation content item to a first account associated with the source end user device and not to a second account associated with the destination end user device, if the automatically transferring is performed by overwriting the particular set of digital multimedia rights associated with the destination end user device with the digital rights grants for the subset of digital multimedia rights;
    assessing the separate additional charge for the pay per presentation content item to the second account associated with the destination end user device and not to the first account associated with the source end user device, if the automatically transferring is performed by merging the digital rights grants for the subset of digital multimedia rights with the particular set of digital multimedia rights associated with the destination end user device;
  subsequent to the automatically transferring the subset of digital multimedia rights to the destination end user device, determining that the source end user device has moved out of the physical proximity to the end user device physical location;

responsive to the determining that the source end user device has moved out of the physical proximity to the end user device physical location, automatically withdrawing the subset of digital multimedia rights from the destination end user device, wherein the determining that the source end user device has moved out of the physical proximity to the end user device physical location is in accordance with both a received indication, from the femtocell, that the source end user device has de-registered from the femtocell at the end user device physical location and a received indication, from an Internet Protocol Television (IPTV) network, that the source end user device has registered with a mobile carrier cell system; and restoring the particular set of digital multimedia rights of the destination end user device to a state that existed before the automatically transferring occurred.

16. The non-transitory, machine-readable storage medium of claim 15, wherein the source end user device is a mobile device and the destination end user device is a set top box.

17. The non-transitory, machine-readable storage medium of claim 15, wherein the determining that the source end user device has moved into physical proximity to the end user device physical location associated with the destination end user device is based on cyclic calendar information associated with the source end user, wherein the automatically transferring the subset of digital multimedia rights comprises adjusting an end user profile associated with the destination end user, and wherein the operations further comprise, subsequent to the automatically transferring the subset of digital multimedia rights, causing a query to be provided to the source end user regarding extending a duration of transfer of the subset of digital multimedia rights, and terminating the transfer of the subset of digital multimedia rights if the query is not acknowledged.

18. The non-transitory, machine-readable storage medium of claim 17, wherein the automatically transferring the subset of digital multimedia rights comprises adding, to the end user profile associated with the destination end user, the digital rights grants for the subset of digital multimedia rights.

19. The non-transitory, machine-readable storage medium of claim 15, the operations further comprising sending an inter carrier transfer data token to an inter carrier token server responsive to a determination that a carrier for the destination end user differs from a carrier for the source end user.

20. The non-transitory, machine-readable storage medium of claim 19, wherein the inter carrier transfer data token comprises data indicating the source end user, the carrier for the source end user, the subset of digital multimedia rights, and the destination end user.

\* \* \* \* \*